UNITED STATES PATENT OFFICE.

JOHANN BAMMANN, OF ELBERFELD, GERMANY, ASSIGNOR TO THE FARBENFABRIKEN OF ELBERFELD COMPANY, OF NEW YORK.

DARK-BLUE TETRAZO DYE AND PROCESS OF MAKING SAME.

SPECIFICATION forming part of Letters Patent No. 606,264, dated June 28, 1898.

Application filed December 20, 1897. Serial No. 662,701. (Specimens.) Patented in France October 30, 1893, No. 233,732; in England October 31, 1893, No. 20,579, and in Italy December 31, 1893, XXVIII, 36,335, LXXI, 208.

*To all whom it may concern:*

Be it known that I, JOHANN BAMMANN, doctor of philosophy, chemist, (assignor to the FARBENFABRIKEN OF ELBERFELD COMPANY, of New York,) residing at Elberfeld, Germany, have invented a new and useful Improvement in Tetrazo Dyes, (for which the Farbenfabriken, vormals Fr. Bayer & Co., of Elberfeld, Germany, has already obtained Letters Patent in England, No. 20,579, dated October 31, 1893; in France, No. 233,732, dated October 30, 1893, and in Italy, Reg. Gen., Vol. XXVIII, No. 36,335, Reg. Att., Vol. LXXI, No. 208, dated December 31, 1893;) and I hereby declare the following to be a clear and exact description of my invention.

My invention relates to the production of new tetrazo dyestuffs by combining one molecule of a tetrazotized paradiamin—such as benzidin, tolidin, or dianisidin—with one molecule of the 1.8 amidonaphthol, 4.6 disulfoacid which is described in the German Letters Patent No. 80,741, dated August 20, 1893, granted to the Farbenfabriken, vormals Friedrich Bayer & Co., of Elberfeld, Germany, and further combining the resulting intermediate product with one molecule of amidonaphtholmonosulfo-acid G.

In carrying out my process practically I can proceed as follows, (the parts are by weight:) 9.2 parts of benzidin are tetrazotized in the usual manner by means of forty parts of hydrochloric acid (19° Baumé) and seven parts of sodium nitrite. To the resulting icy-cold tetrazo solution after being neutralized by means of sodium carbonate an icy-cold solution of 18.5 parts of 1.8 amidonaphthol, 4.6 disulfonate of sodium in two hundred parts of water, which solution has been rendered alkaline by means of sodium carbonate, is added with stirring. After the formation of the intermediate product is finished immediately a weak alkaline solution prepared by dissolving 12.5 parts of amidonaphtholmonosulfo-acid G in two hundred parts of water with the addition of sodium carbonate is stirred into the reaction mixture. Stirring is continued for about twelve hours. Subsequently the mixture is heated to about 50° centigrade, and finally the finished dyestuff is precipitated by means of common salt filtered, pressed, dried, and pulverized. It is the sodium salt of an acid having the formula

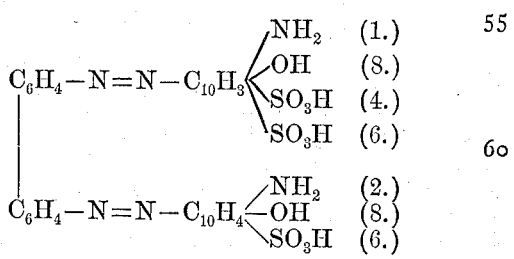

and represents a dark powder with a metallic luster, easily soluble in water with a blackish-blue color, in concentrated sulfuric acid (66° Baumé) with a pure-blue color, which changes into violet on the addition of a small quantity of ice, while a violet-blue flaky precipitate is obtained on adding a larger quantity of ice to the sulfuric-acid solution.

The new dyestuff yields on unmordanted cotton blackish-blue shades.

If in the place of benzidin tolidin or dianisidin is employed, dyestuffs are obtained which yield more bluish shades on unmordanted cotton. All these dyestuffs can be rediazotized either in solution or on the fiber and further combined with amins or phenols.

Having now described my invention and in what manner the same is to be performed, what I claim as new, and desire to secure by Letters Patent, is—

1. As new articles of manufacture the new tetrazo dyestuffs being alkaline salts of acids having the general formula

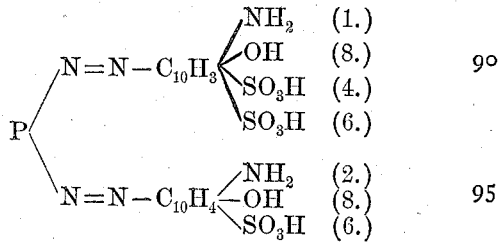

in which formula P means a radical of the benzidin series such as diphenyl, ditolyl, diphenolether, which are dark powders easily soluble in water, being rediazotizable in solution or when on fiber, yielding on unmordanted cotton from blackish-blue to blue shades substantially as described.

2. As a new article of manufacture the specific dyestuff being an alkaline salt of an acid having the formula

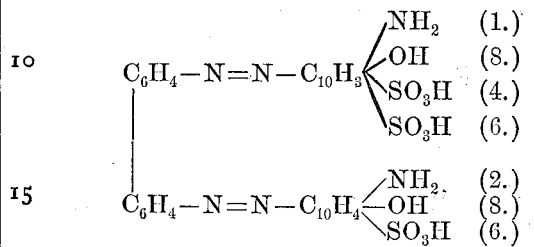

which are in the form of the sodium salt a dark powder with a metallic luster, easily soluble in water with a blackish-blue color, in concentrated sulfuric acid (66° Baumé) with a pure-blue color which changes into violet on the addition of a small quantity of ice while a violet-blue flaky precipitate is obtained on adding a larger quantity of ice to the sulfuric-acid solution, being rediazotizable in solution or when on fiber, yielding on unmordanted cotton blackish-blue shades.

In testimony whereof I have signed my name in the presence of two subscribing witnesses.

JOHANN BAMMANN.

Witnesses:
R. E. JAHN,
OTTO KÖNIG.